Jan. 17, 1967   R. BLAU ETAL   3,299,376
YTTRIUM IRON GARNET PRESELECTORS
Original Filed Oct. 17, 1961   3 Sheets-Sheet 1
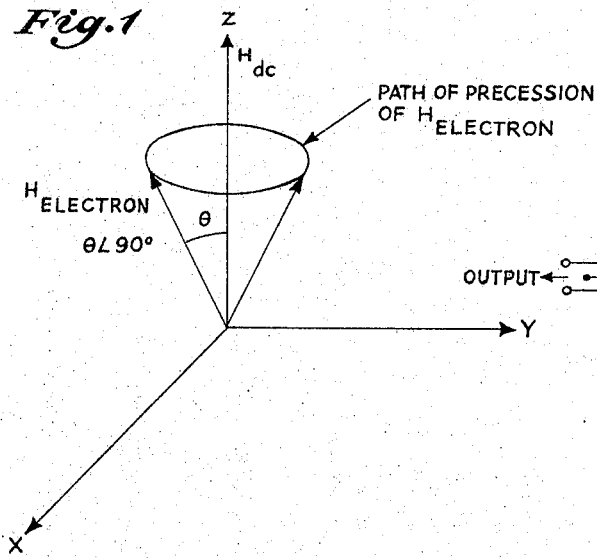
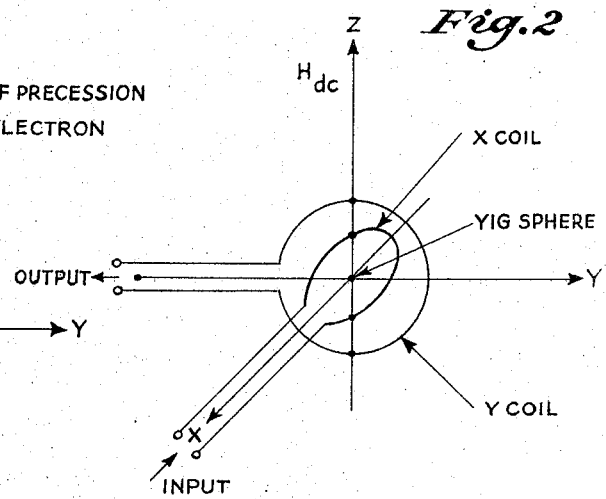
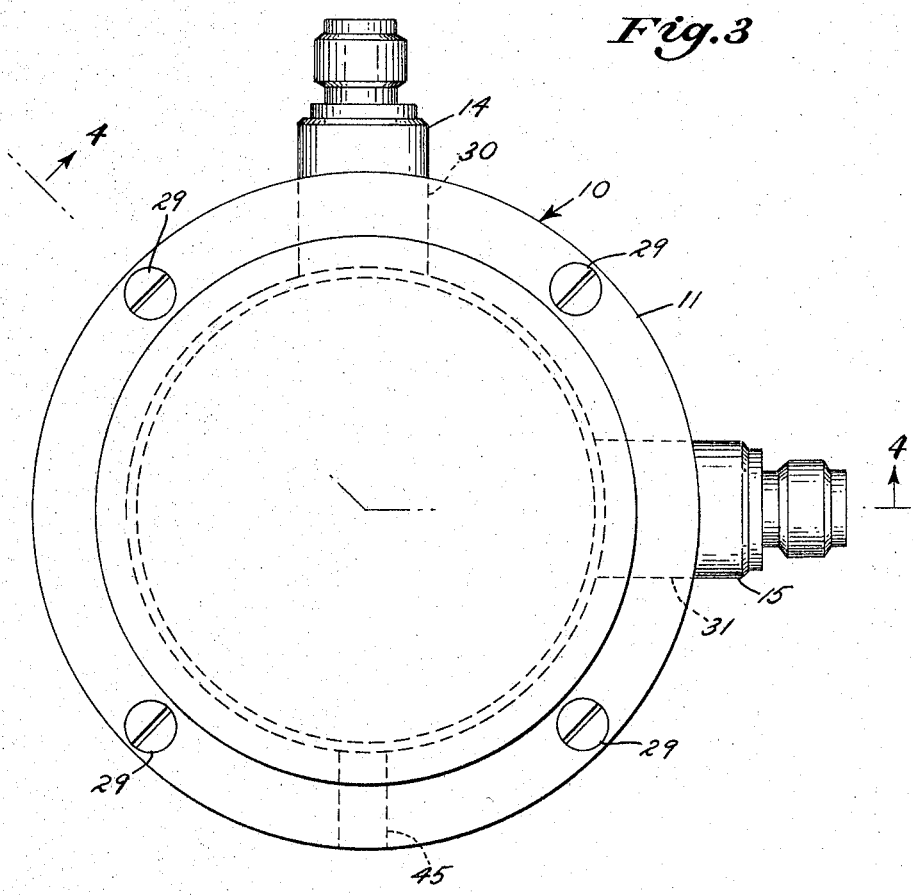

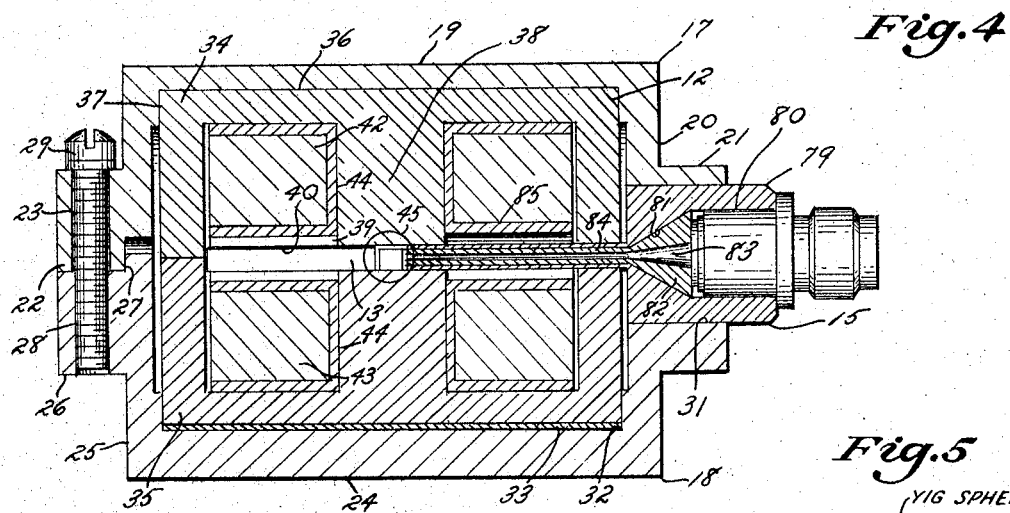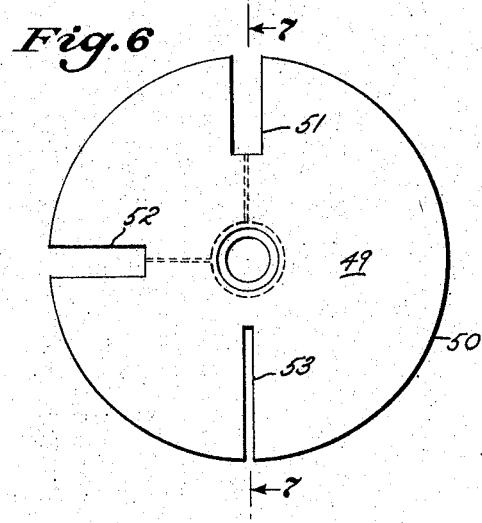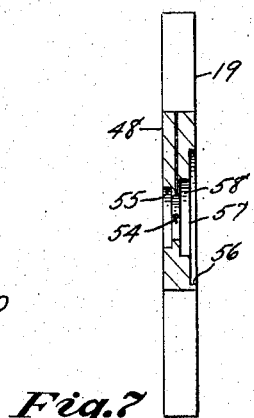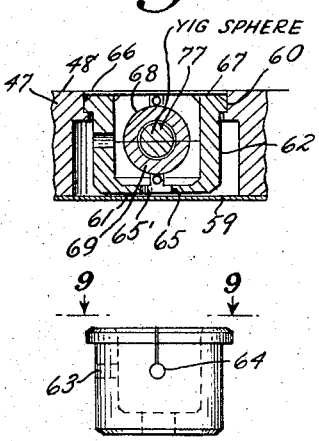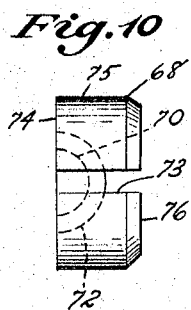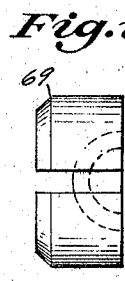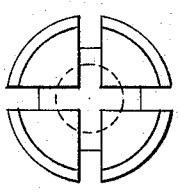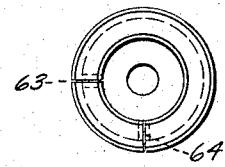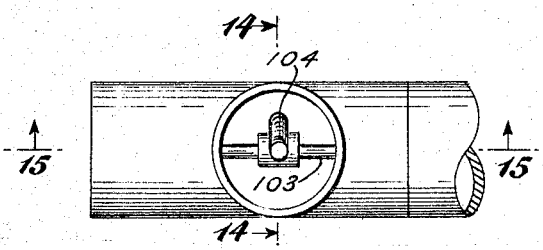

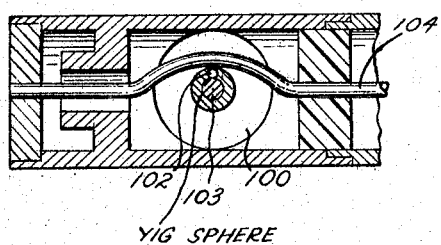
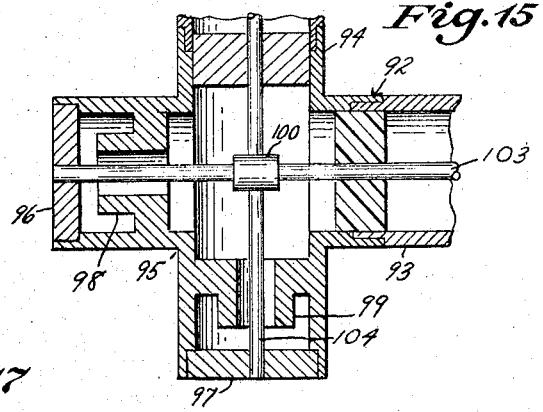
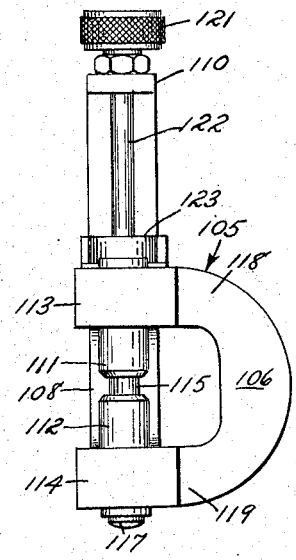
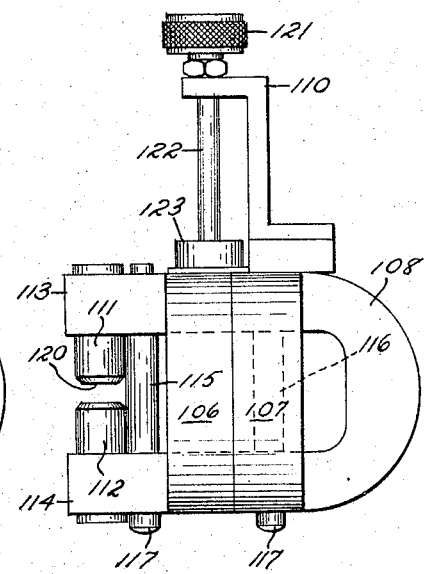
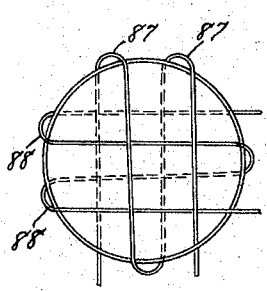
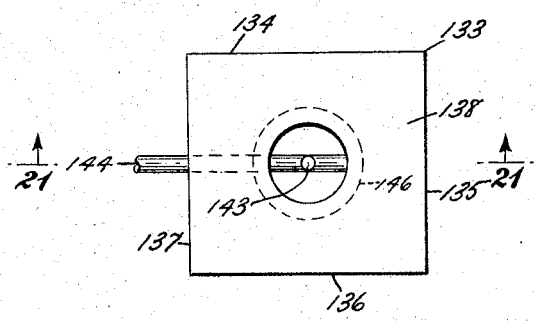
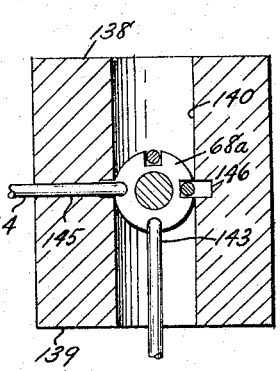

100 # United States Patent Office 3,299,376
Patented Jan. 17, 1967

3,299,376
YTTRIUM IRON GARNET PRESELECTORS
Robert Blau, North Bergen, N.J., Burton Sedlak, Brooklyn, and Robert M. Phillips, Bronx, N.Y., assignors to Loral Electronics Corporation, Bronx, N.Y., a corporation of New York
Continuation of application Ser. No. 179,824, Oct. 17, 1961. This application Feb. 10, 1965, Ser. No. 433,842
4 Claims. (Cl. 333—24.2)

This application is a continuation of our copending application Serial No. 179,824, filed October 17, 1961, now abandoned.

This invention relates generally to the field of microwave radio reception, and more particularly with improved electronically tunable microwave preselectors. Electronic preselectors may be loosely defined as band pass filters capable of operating in the range from 500 megacycles to as high as 12.4 kilomegacycles. Devices of this type have application in the field of radar receivers and similar devices operating in the above-mentioned frequency range, and may be of a rapid sweep variable type, or may be manually tuned, depending upon the particular application involved.

It is among the principal objects of the present invention to provide an improved electronic preselector utilizing the magnetic properties of yttrium iron garnet, as well as gallium substituted yttrium iron garnet, single crystal structures.

Another object of the invention lies in the provision of improved electronically tunable preselectors which may be of a reduced bulk and weight as contrasted with equivalent distributed parameter circuits known in the art which they may replace.

A further object of the invention lies in the provision of improved electronic preselectors of the type described having provision for adjustable band widths for differing applications.

A further object of the invention lies in the provision of an electronically tunable preselector having a degree of signal limiting which may be utilized to protect other sensitive components in an electronic circuit from high level signals received within a sweep range.

Still another object of the invention lies in the provision of an improved preselector having temperature stability equal or superior to that of typical temperature compensated distributed-parameter circuits.

A further object of the invention lies in the provision of an electronically tunable preselector having a susceptibility to vibration and shock which is less than that obtained with typical distributed-parameter mechanically tuned circuits.

A further object of the invention lies in the provision of an improved electronically tunable preselector in which production costs encountered during manufacture are lower than those encountered in the manufacture of present devices.

Still another object of the invention lies in the provision of electronically tunable preselector in which insertion loss and offband rejection are markedly improved as contrasted with prior art devices.

A further object of the invention lies in the provision of a tunable preselector having both decreased bulk and weight as well as decreased power consumption, as contrasted with prior art devices.

A feature of the invention lies in the provision of manually tuned components for such applications as require the same.

Another feature of the invention is the improved range of tunable frequencies provided by the disclosed embodiments.

These objects and features, as well as other incidental ends and advantages, will more fully appear in the progress of the following disclosure, and be pointed out in the appended claims.

In the drawings, to which reference will be made in the specification, similar reference characters have been employed to designate corresponding parts throughout the several views.

FIGURE 1 is a schematic view in perspective showing the precession effect obtained using single crystal material employed in the fabrication of one of the components of various embodiments of the invention.

FIGURE 2 is a schematic view showing the coupling of input and output signals during operation of the embodiments.

FIGURE 3 is a plan view of a first embodiment of the invention.

FIGURE 4 is a vertical sectional view of the first embodiment as seen from the planes 4—4 in FIGURE 3.

FIGURE 5 is a fragmentary enlarged sectional view corresponding to the central portion of FIGURE 4.

FIGURE 6 is an elevational view of a support forming a part of the first embodiment.

FIGURE 7 is a transverse sectional view as seen from the plane 7—7 in FIGURE 6.

FIGURE 8 is a side elevational view of a retainer member forming a part of the first embodiment.

FIGURE 9 is a plan view thereof, as seen from the plane 9—9 in FIGURE 8.

FIGURE 10 is a side elevational view of a yttrium iron garnet sphere housing member forming a part of the first embodiment.

FIGURE 11 is a similar view of a symmetrical part corresponding to that seen in FIGURE 10.

FIGURE 12 is an end elevational view of the structure seen in FIGURE 10.

FIGURE 13 is a fragmentary view in elevation, partly broken away to show detail, of a second embodiment of the invention.

FIGURE 14 is a fragmentary sectional view as seen from the plane 14—14 in FIGURE 13.

FIGURE 15 is a fragmentary sectional view as seen from the plane 15—15 in FIGURE 13.

FIGURE 16 is a top plan view of a manually tunable magnet assembly which may be used in conjunction with the second embodiment of the invention.

FIGURE 17 is an end elevation view of the magnet assembly.

FIGURE 18 is a side elevational view of the magnet assembly.

FIGURE 19 is a schematic diagram showing an alternate form of input-output coupling suitable for suppressing spurious reception.

FIGURE 20 is a plan view of a spurious mode suppressing cavity which may be used in conjunction with either of the first and second embodiments.

FIGURE 21 is a sectional view as seen from the plane 21—21 in FIGURE 20.

Before entering into a detailed consideration of the disclosed embodiments, a discussion of the nature of the single crystal material forming an essential part of the devices is in order.

In 1951, Yoder and Keith [1] fabricated the first yttrium iron garnet (hereinafter referred to as YIG) by substituting yttrium into the original mineral garnet. The formula for garnet is $Mn_3Al_2Si_3O_{12}$. In 1956, Bertaut and Forrat [2] reported on the preparation and magnetic properties of yttrium substituted iron garnet, $Y_3Fe_5O_{12}$. It was soon found that this material exhibited an unloaded Q greater than 1,500 in the 2 to 12 kmc. frequency range. This value of unloaded Q in YIG material is comparable to the Q of an electromagnetic field cavity resonator.

The behavior of YIG material at microwave frequencies may be explained in a simple but unrigorous fashion as follows. With reference to FIGURE 1 in the drawings, each molecule of this material has an unpaired electron which is sprinning. The spinning electron generates a magnetic field along its spin axis, $H_{electron}$. When D.-C. magnetic field, $H_{d.-c.}$, is impressed, all the $H_{electron}$ vectors for the unpaired electron in each molecule line up within 90° of the D.-C. magnetic field vector. This situation is analogous to that of an inclined, spinning gyroscope in a gravitational field, where the axis of the gyroscope begins to precess around the direction of the gravitational field. The spinning electrons have axes that also precess, but around the direction of the applied magnetic field. A simple equation for this gross effect may be written as follows:

$$f = 2.8H$$

where $f$ is the frequency of precession for the electron spin axes in megacycles, and H is the applied D.-C. magnetic field in oersteds (equal to gauss for air). Precession frequency, therefore, can be varied by varying the magnitude of the D.-C. magnetic field. Measurements of Q as a function of frequency may be made by placing samples of YIG material into RF cavities, and measuring the effect this material has on the Q of the cavity [3]. The magnetic field is set up such that the gyromagnetic resonance occurs in the YIG material for the center frequency of the cavity.

Additional work on the theoretical behavior of these materials has been reported by R. C. Le Craw and E. G. Spencer [4], and F. R. Morgenthaler [5] There has been further progress by other workers as well [6].

Actual construction of tunable microwave devices has been reported by P. S. Carter, Jr. [7], and a paper on further work with such structures was presented in March 1959, by the same author [8], in which was detailed the results of research for X-band tunable devices.

In each case, the material used was a grown single crystal of YIG that had been ground and brought to a high polish with the techniques described by W. L. Bond [9]. In general, these crystals had a diameter range of 20–50 mils. During tests, and on the basis of previously established theory, it was found that a spurious response, not determined by the above equation, exists in the YIG material. This response is due to a higher order magnetostatic mode that may be set up in the YIG sphere [10], and is approximately 400–800 mc. removed from the main response. Its magnitude, with respect to the main response, varies as a function of sphere diameter. The bulk of these devices have been operative, within relatively narrow limits, but have been impractical owing to high weight (approximately 2.4 pounds), substantial volume (about 3 inches in diameter by 2½ inches high), and high power consumption (approximately 5 watts maximum).

Considering the basic mechanism for tunable devices, reference may be had to FIGURE 2 in the drawing. If a YIG sphere is situated at the origin, and if RF energy is coupled in along the X axis, and coupled out along the Y axis, then the frequency at which coupling will occur from the input to the output depends upon the magnitude of the D.-C. magnetic field directed along the Z axis. As shown in FIGURE 2, the two coils used to couple RF energy have their axes at right angles to each other, with the YIG sphere at the intersection of the axes origin. When the ferrite is not magnetized, there is no power transfer between the coils because the loop axes are perpendicular to each other. When a D.-C. magnetic field is applied along the Z axis, the input RF driving current applied to the terminals of the X-coil forces the electrons in the YIG sphere to precess around the Z axis. This produces an RF magnetic movement along the Y axis to induce a voltage in the Y-coil circuit. Precession for a YIG sphere is strongest at ferromagnetic resonance, and coupling from input to output is also strongest at resonance. Coupling varies off resonance as determined by the degree of coupling of the input and output circuits to the YIG sphere. Thus, the loaded Q of such a device is determined not only by the unloaded Q of the YIG material, but by the tightness of the coupling. It has been experimentally determined that increasing Q makes possible an approximate constant band width as a function of frequency.

In the region from below 500 mc. to 4 kmc., gallium-substituted yttrium iron garnet (hereinafter referred to as GAYIG) may be used. Tests of GAYIG material have indicated [11] that narrow ferromagnetic linewidths at resonance may be extended to these lower frequencies.

With the foregoing in view, reference may be had to FIGURES 3, 4 and 5 in the drawings, wherein a first embodiment of the invention, generally indicated by reference character 10, is illustrated. The device 10 includes broadly an outer housing element 11, an electromagnetic core element 12, sphere supporting means 13, input coupling means 14, and output coupling means 15.

The outer housing element 11 is of generally cylindrical configuration, and is preferably formed from machined aluminum alloy or other similar material having favorable lightweight and anticorrosion characteristics. In most installations, it will be preferable to have the outer surface anodized. The housing element includes an upper housing member 17 and a lower housing member 18 of generally symmetrical configuration.

The upper housing member 17 includes a planar end wall 19, a cylindrical side wall 20, and a planar flange 21 having a projection 22 thereon forming a mating fit with the lower housing member 18. A plurality of axially disposed peripheral bores 23 are disposed upon the flange 21. The lower housing element 18 is generally similar, including a planar end wall 24, a cylindrical side wall 25 and a planar flange 26 including a peripheral groove 27 which mates with the projection 22. Threaded bores 28 are engageable by screw means 29 which extend through the bores 23 and thus interconnect the housing members 17 and 18. The interconnected element 11 includes a first radially disposed bore 30 accommodating the input coupling means 14, and a second radially disposed bore 31 accommodating the output coupling means 15, the axes of the bores 30 and 31 being disposed substantially at a right angle. A cylindrical recess 32 is provided with a neoprene disc 33 which serves as a shock absorber and vibration dampener particularly useful in military-type installations.

The electromagnetic core element 12 may be formed of any suitable material, and preferably powdered iron because of its low core loss. The element 12 is formed

---

[1] H. S. Yoder and M. L. Keith, American Mineralogist, vol. 36, 1951, p. 519.
[2] Structure des Ferrites Ferrimagnetiques des Terres Rares, F. Bertaut and F. Forrat, C. R. Paris, vol. 242, 1956, pp. 382–384.
[3] Le Craw, Spencer, and Porter, Physics Review, vol. 110, 1958, p. 1311.
[4] R. C. Le Craw and E. G. Spencer, Journal Applied Physics, supplement vol. 30, No. 4, April 1959, pp. 185S–186S.
[5] F. R. Morgenthaler, Journal Applied Physics, supplement vol. 30, No. 4, April 1959, p. 157S.
[6] Garnets, Journal Applied Physics, supplement vol. 31, No. 5, 1960, pp. 30–55.
[7] P. S. Carter, Jr., SR1 Project 2326, October 1959, pp. 1–21.
[8] P. S. Carter, Jr., IRE 1960 National Convention Proceedings on Microwave Theory and Techniques, p. 130.
[9] W. L. Bond, Review Scientific Instruments, vol. 22, 1951, p. 34.
[10] Resonant Modes of Ferromagnetic Spheroids, L. R. Walker, Journal Applied Physics, vol. 29, March 1958, pp. 318–323.
[11] Bulletin of the American Physical Society, E. G. Spencer and R. C. Le Craw, Line Width Narrowing in Gallium Substituted Yttrium Iron Garnet, Series II, vol. 5, No. 1, January 27, 1960, page I, p. 58.

in two pieces including an upper core member 34, and a symmetrical lower core member 35. Each member 34–35 includes a bottom wall 36, a cylindrical side wall 37, and a central projection 38 defining an annular cavity 39. As the height of the central projection 38 is less than that of the cylindrical side wall 37, there is also defined a circular flat cavity 40 in which the sphere supporting means 13 is positioned. The solenoid windings 42 and 43 are preferably wound on bobbins 44 for easy insertion. A bore 45 (FIGURE 3) provides for electrical leads (not shown) to the windings 42 and 43.

Referring to FIGURE 5, the sphere supporting means 13 includes a brass disc 47, shown in greater detail in FIGURES 6 and 7, approximately .080 inch thick, and bounded by an upper surface 48, a lower surface 49, and a circular peripheral edge 50. A slot 51 is provided for accommodating the input lead conductor of the coupling means 14, and a similar slot 52 disposed at right angles with respect to the slot 51 accommodates the corresponding lead of the coupling means 15. A third slot 53 provides for the leads leading to the windings 42 and 43 previously described. A centrally disposed bore 54 extends axially through the plane of the disc 47, as does a centrally disposed bore 55 communicating therewith. A partial counterbore 56 provides a supporting ledge 57 bordered by a second counterbore 58. A ground plate 59 of copper is fitted within the counterbore 56.

Supported by the ledge 57 is an inner cup-shaped housing 60 of Teflon or other suitable synthetic resinous material. As seen in FIGURES 5 and 8 in the drawing, the housing 60 includes a bottom wall 61, a cylindrical side wall 62 having openings 63 and 64 alignable with the slots 51 and 52, respectively, in the disc 47. The bottom wall 61 includes an axially disposed circular opening 65 normally closed by a plug 65', the opening 65 facilitating assembly of the device. A peripheral flange 66 corresponds in diameter to that of the upper partial counterbore 55, and is maintained within the same by a retainer member 67, preferably of brass, or other non-magnetic material.

Supported within the housing 60 are a pair of symmetrical sphere-holding members 68 and 69, each including a hemispherical recess 70, and first and second winding grooves 72 and 73. An abutting surface 74, a cylindrical surface 75, and an end surface 76 define the dimensions of the members 68 and 69, which are substantially less than the interior cavity of the housing 60. The YIG sphere 77 is supported within the recesses 70 after assembly of the members 68 and 69. To maintain the thickness of the disc 47 at a minimum, the conductors which are disposed in the first and second winding grooves 72 and 73 extend around the sphere-holding members 68 and 69 through an arc of approximately 270°, and are grounded to the ground plate 59, the circuits being completed through conductors (not shown) which are positioned in the slots 50 and 51.

The coupling means 14 and 15 are substantially similar, each including an outer conductor 79 having a centrally disposed bore 80 and a tapered recess 81 in which there is disposed a correspondingly shaped insulator 82. The inner conductor 83 is provided with connecting means 84 leading to a loop conductor 85 which is wound about one of the grooves 72 and 73.

Referring to FIGURE 19, there is schematically illustrated an alternate form of winding featuring double loops 87 and 88 to replace the single loops disposed in the grooves 72 and 73 of the principal form. As previously mentioned, the effect of double loop winding about the sphere 77 effectively suppresses spurious modes, while strengthening the true frequency response. It is theoretically possible to still further increase the number of loops about the sphere 77, but it is to be appreciated that the occurrence of the spurious response varies in strength as a function of the diameter of the sphere, so that it is preferable to keep the sphere in relatively small dimension with a correspondingly fewer number of loops.

Referring to FIGURES 20 and 21, there is shown an alternate form of means for suppressing spurious modes, which may be employed where the construction shown in FIGURE 19 is not practical. As the diameter of the YIG sphere decreases, the difficulty of tightly winding more than a loop of wire about the same increases. A certain practical limit is reached in the case of small spheres which dictates resort to other means for suppressing spurious modes.

In lieu of the Teflon housing 60, the sphere-holding members are disposed within a brass cavity-forming member 133, which may be of generally outer rectangular configuration, bounded by side surfaces 134, 135, 136, 137, as well as end surfaces 138 and 139. An axial bore 140 is of interior diameter corresponding to the sphere-holding member 68a. The output loop 143 is introduced directly into the bore 140, and is arranged coaxially therewith. The input loop 144 is disposed in a transverse bore 145 which communicates with a ring-like recess 146. The bore 140 of the member 133 having a rectilinear axis, tends to provide the same effect as a plurality of convolutions in the loop, that is to say it provides an effect analogous to that obtained wherein the input loop consists of a plurality of convolutions the axis of which is parallel to the axis of the bore 140.

Referring to FIGURES 13, 14 and 15 in the drawings, there is illustrated a second embodiment of the invention employing interconnected coaxial cables. With particular reference to FIGURE 15, the device, generally indicated by reference character 92, includes a first coaxial conductor 93 and a second coaxial conductor 94 interconnected at right angles at 95. Each of the conductors 93 and 94 is "shorted," that is to say the inner coaxial portions thereof are interconnected with the outer coaxial portions thereof by transverse members 96 and 97 which interconnect with resonance forming members 98 and 99. The sphere-holding device 100 is located on the axis of interconnection, the YIG sphere 102 being disposed directly within the skew axis of the inner coaxial members 103 and 104 so as to lie within the magnetic field of each. Magnetic means (not shown) is disposed externally of the conductors 93 and 94 to provide a direct current magnetic flux passing through the sphere 102. If desired, a manually tunable magnet, such as that illustrated in FIGURES 16, 17 and 18, may be employed. The magnet, generally indicated by reference character 105, includes first, second and third magnet elements 106, 107 and 108, all of which are engaged with a pole piece support element 109. The strength of the magnetic field existing between a positive pole 111 and a negative pole 112 is varied by flux adjustment means 110 which includes a rod, the relative position of which with respect to the magnet elements 106–108 may be altered. As seen in FIGURES 17 and 18, the element 109 includes a first elongated member 113, a second elongated member 114, and spacing members 115 and 116, the element 109 being integrated by screw means 117. Each of the elements 106–108 includes a positive pole 118 and a negative pole 119 associated in conformance with the polarity of the pole pieces 111 and 112. The gap 120 existing between the pole pieces 111 and 112 is just sufficient to permit the appropriate sphere-holding members to be positioned therebetween.

Referring to the flux-adjustment means 110, a manually engageable member 121 supports a metallic core 122, a guide member 123 serving to keep the core member aligned. From a consideration of FIGURE 16, it will be observed that the core 122 lies directly in the fields of all three magnet elements 106–108, and thus can vary the flux as the same influences the pole pieces 111 and 112.

We wish it to be understood that we do not consider the invention limited to the precise details of structure shown and set forth in this specification, for obvious modifications

We claim:

1. In a gyromagnetic coupling device, including a sphere of gyromagnetic material, and a pair of conductors disposed at a substantial mutual angle, improved sphere-supporting means comprising: a pair of symmetrical holding members, each of said holding members having a substantially hemispherical recess corresponding in diameter to that of said sphere, each of said members having grooves positioned in an outwardly disposed surface thereof, said conductors being positioned within the grooves in each of said holding members to maintain the same in surrounding relation with respect to said sphere.

2. In a gyromagnetic coupling device, including a sphere of gyromagnetic material, and a pair of conductors disposed at a substantial mutual angle, improved sphere-suppporting means comprising: a pair of symmetrical holding members, each of said holding members having a substantially hemispherical recess corresponding in diameter to that of said sphere, each of said members having grooves positioned in an outwardly disposed surface thereof, said conductors being positioned within the grooves in each of said holding members to maintain the same in surrounding relation with respect to said sphere; a generally cup-shaped housing having a cylindrical recess therein, said holding members being disposed within said recess, said housing having openings for the entry of said pair of conductors therethrough; a conductive grounding plate contiguous with one of said openings, each of said conductors surrounding said sphere through substantially 270° and being grounded to said plate.

3. In a gyromagnetic coupling device, including a sphere of gyromagnetic material, and a pair of conductors disposed at a substantial mutual angle, improved sphere-supporting means comprising: a pair of symmetrical holding members, each of said holding members having a substantially hemispherical recess corresponding in diameter to that of said sphere, each of said members having grooves positioned in an outwardly disposed surface thereof, said conductors being positioned within the grooves in each of said holding members to maintain the same in surrounding relation with respect to said sphere; a cavity-forming member having a cylindrical bore therein corresponding in diameter to that outer diameter of said holding members, said holding members being disposed within said bore; said cavity-forming members having at least one opening therein for passage of a conductor therethrough to communicate with said bore.

4. In a gyromagnetic coupling device having a sphere of gyromagnetic material and a pair of conductors disposed at a mutual angle, at least partially surrounding said sphere, improved sphere-supporting means comprising: a metallic disc including first and second parallel surfaces and a generally circular peripheral edge, there being a centrally disposed bore extending axially through the plane of said disc, a first concentrically disposed counterbore communicating therewith extending from one of said surfaces, and a second concentrically disposed counterbore extending from the other of said surfaces to form a circular ledge, a conductive ground plate disposed within said second counterbore; a cup-shaped housing having a recess supported in said first counterbore and extending into said second counterbore, said cup-shaped housing having an opening communicating between said recess and said ground plate; a pair of symmetrical sphere-holding members, each of said holding members having a substantially hemispherical recess corresponding in diameter to that of said sphere, each of said members having grooves positioned in an outwardly disposed surface thereof, said conductors being positioned within said grooves to maintain the same in surrounding relation with respect to said sphere.

References Cited by the Examiner

UNITED STATES PATENTS 2,764,676   9/1956   Bradley.

HERMAN KARL SAALBACH, *Primary Examiner.*

P. L. GENSLER, *Assistant Examiner.*